US006887954B2

(12) United States Patent
Maurel

(10) Patent No.: US 6,887,954 B2
(45) Date of Patent: May 3, 2005

(54) POLYMERIZATION CATALYST

(75) Inventor: Jean-Alain Maurel, Marseilles (FR)

(73) Assignee: BP Chemicals Limited, London (GB)

( * ) Notice: Subject to any disclaimer, the term of this patent is extended or adjusted under 35 U.S.C. 154(b) by 501 days.

(21) Appl. No.: 09/958,595

(22) Filed: Oct. 11, 2001

(65) Prior Publication Data

US 2002/0048537 A1 Apr. 25, 2002

Related U.S. Application Data

(63) Continuation of application No. PCT/GB00/01098, filed on Mar. 23, 2000.

(30) Foreign Application Priority Data

Apr. 12, 1999 (FR) ............................................. 99 04688

(51) Int. Cl.$^7$ ................................................. C08F 2/34
(52) U.S. Cl. ........................ 526/68; 526/901; 422/131; 422/139; 422/132
(58) Field of Search ................... 526/68, 901; 422/131, 422/139, 132

(56) References Cited

U.S. PATENT DOCUMENTS 4,588,790 A * 5/1986 Jenkins et al. ................ 526/70

FOREIGN PATENT DOCUMENTS

| DE | 1 005 993 | 4/1957 |
| EP | 0 042 892 | 1/1982 |

OTHER PUBLICATIONS

A Private Multiclient Study: Polyolefins through the 80's—The continuing evolution, Polyolefin Technology Update, vol. TU II, Process Costs, Capabilities, Economics, Final Report. Jul. 1986. SRI International Multiclient Project N° 7892.

* cited by examiner

Primary Examiner—William K. Cheung
(74) Attorney, Agent, or Firm—Finnegan, Henderson, Farabow, Garrett and Dunner, L.L.P.

(57) ABSTRACT

The present invention is a process and an apparatus for the gas phase polymerization of olefin(s) using a fluidised-bed reactor (1) from which, at the top part, is withdrawn a recycling gas stream which comprises unreacted gas and entrained solid particles and which is moved by virtue of a compressor (4), which is cooled by passing into a heat exchanger (7) and which is reintroduced into the reactor at the bottom part (1a) of the latter. The heat exchanger (7) is a multitubular exchanger successively comprising an inlet chamber (6), a bundle of tubes (9) with a horizontal longitudinal axis and an outlet chamber (10) equipped with a discharge orifice (11). In the outlet chamber (10) the flow of the gas stream is accelerated up to the orifice (11) and is directed at any point in the said chamber along a horizontal axis and/or towards the bottom part (1a) of the said chamber, so as to create, in the bottom part of the said chamber, a sweeping stream which flows horizontally or with a downward inclination and without obstacle up to the orifice and which promotes the entrainment of the particles up to the orifice.

5 Claims, 3 Drawing Sheets

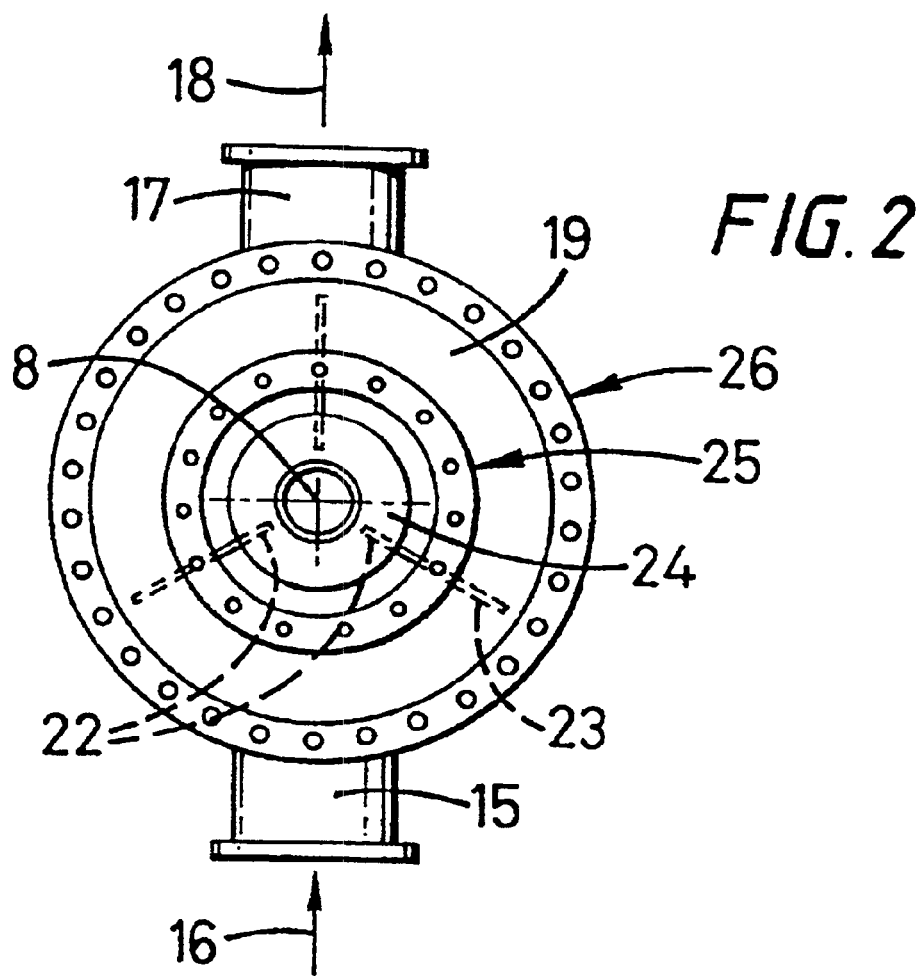
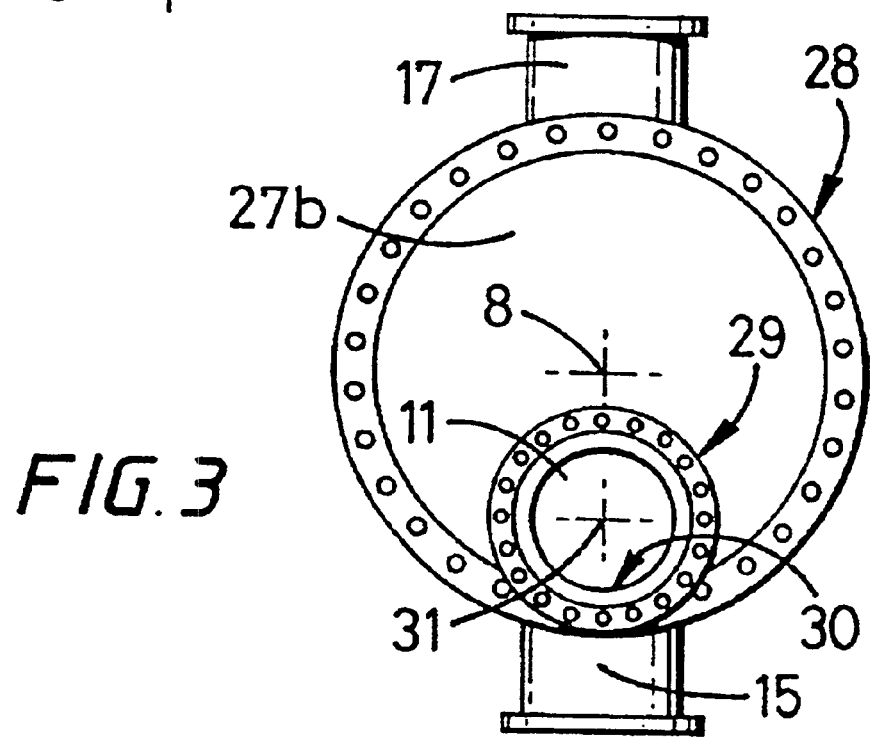

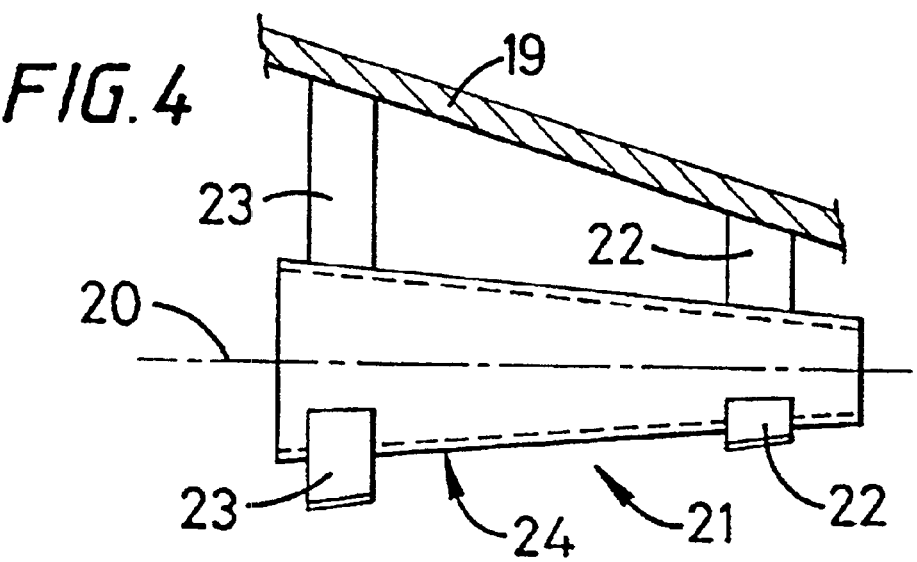
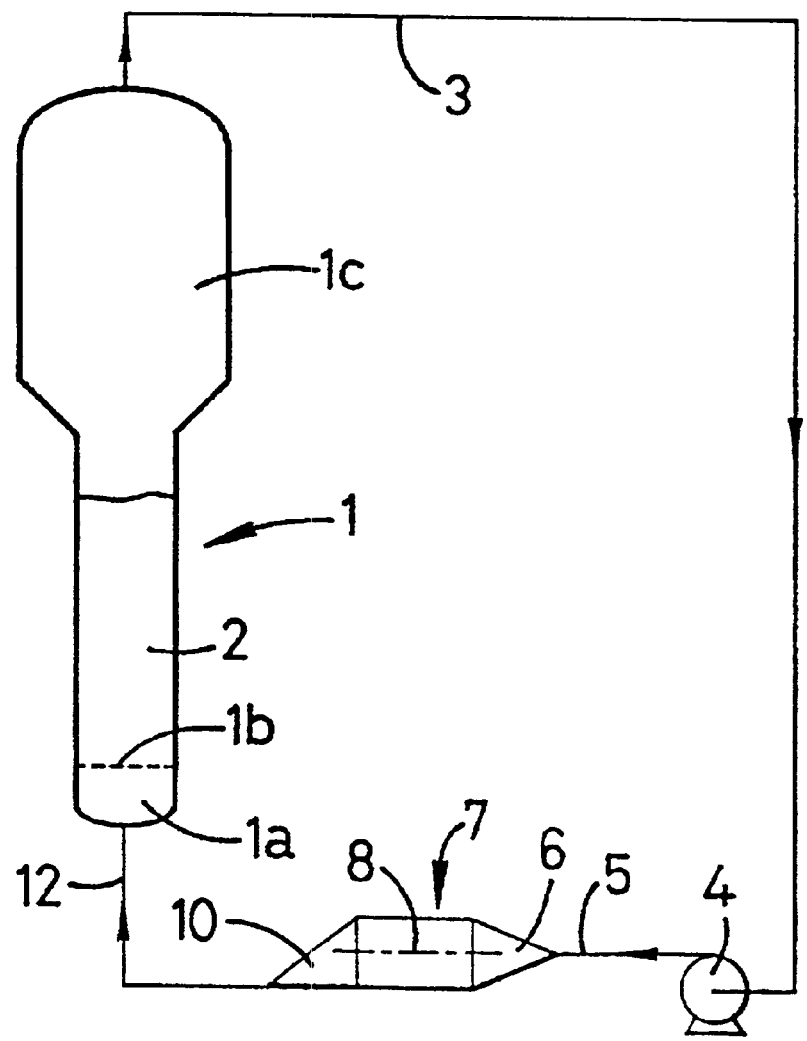

POLYMERIZATION CATALYST

This application is a continuation of PCT/GB00/01098, filed Mar. 23, 2000.

BACKGROUND OF THE INVENTION

The present invention relates to a process and to an apparatus for the gas-phase polymerization of olefin(s) in a fluidized-bed reactor.

It is known to carry out a process for the gas-phase polymerization of olefin(s) in a fluidized-bed reactor fed with olefin(s), with catalyst and optionally with cocatalyst, within which reactor solid particles of polymer in the course of formation, of polymer formed and of catalyst are maintained in the fluidized state by the action of an ascending gas stream, comprising the olefin or olefins, starting from the base of the reactor and rising up to its top part.

The fluidized-bed reactor generally comprises, in its lower part, a fluidization grid, ensuring uniform distribution of the ascending gas stream through the bed, in its central part, a vertical cylindrical barrel comprising the fluidized bed and, in its upper part, a so-called disengagement chamber, in which the ascending gas stream is slowed down because the transverse cross-section of this chamber is wider than that of the cylindrical barrel, so that a substantial portion of the solid particles entrained out of the bed is returned to the bed.

Given that the polymerization reaction is generally exothermic and that, moreover, only a portion of the olefin or olefins reacts when passing through the reactor, the process comprises a recycling loop in which the ascending gas stream withdrawn at the top part of the reactor circulates. The gas stream is moved in the recycling loop by a compressor, cooled by at least one heat exchanger and reinjected at the bottom part of the reactor with a velocity sufficient to maintain the solid particles in the fluidized state in the bed.

The recycling loop usually comprises at least one pipe for conveying the gas stream withdrawn at the top of the reactor, optionally at least one gas/solid separator capable of separating, from the gas stream, a substantial portion of the solid particles entrained with it out of the reactor and in retaining them out of the gas stream, at least one heat exchanger for cooling the gas stream, at least one compressor for circulating the gas stream in the loop and at least one pipe for conveying the gas stream in order to introduce it at the bottom part of the reactor, in particular under the fluidization grid.

Despite the presence of the disengagement chamber at the upper part of the reactor and optionally of a gas/solid separator positioned on the recycling loop, the gas stream circulating in the loop can be laden with fine solid particles. These particles can be deposited and can pile up in a portion of the loop, and can react with the olefins and can form a polymer mass capable of partially blocking the loop, for example a portion of the heat exchanger at least.

In order to overcome this problem, Patent FR-A-2,634, 212 provides for making available a heat exchanger in the loop and for injecting a liquid hydrocarbon upstream of the exchanger, in order to wash and clean the interior of the exchanger.

Furthermore, International Patent Application WO9820046 provides, with the same aim, for the introduction, at one or more points in the loop, of an agent which prevents the deposition of polymer particles and which is composed of an alcohol, of an alkyl ether, of ammonia, of an inorganic acid ester, of a compound from Group IV of the Periodic Classification of the Elements, of a compound comprising sulphur, of alkylamine or of a mixture of these.

However, one or other of the methods provided consists in adding a component to the gas stream circulating in the recycling loop, which component modifies the composition of the gas stream and can thus disrupt the polymerization reaction in the fluidized bed.

The U.S. Pat. No. 4,588,790 discloses a continuous gas fluidised bed process for the production of polymer, continuously passing a gaseous stream through a fluidised bed in a reactor zone, withdrawing from this reactor zone polymer product and a stream comprising unreacted gases and solid particles, cooling said stream to condense a portion thereof and form a liquid containing mixture wherein the weight ratio of liquid to solid particles is not less than two to one. This method is used to avoid the formation of wet agglomerate solid particles which accumulate in regions of low velocity in the recycle lines and heat exchanger.

This document does not describe the essential characteristics of the invention and does not address the problem of deposition, accumulation and/or piling up of particles in the recycling loop in general terms, whatever the conditions of polymerization and, particularly when it is not desired or possible to condense part of the recycled stream.

Numerous efforts have been made for a long time to find a solution to this problem. In particular, it was found that this problem became even more acute when an additional heat exchanger was installed in the recycling loop of a fluidized-bed reactor for the purpose of increasing the heat exchange capacity and consequently the polymer production of the reactor. In addition, the only way of adding this exchanger to the loop was to position it horizontally, due to the lack of space in the plant. The additional heat exchanger was of multitubular type, successively comprising an inlet chamber, a bundle of tubes with a horizontal longitudinal axis which is encased in a horizontal cylindrical shell, and an outlet chamber, the inlet and outlet chambers each being essentially composed of the casing of a right truncated cone (also known as a right circular truncated cone) with a horizontal axis of symmetry identical to that of the cylindrical shell. Very rapid fouling of the bottom part of the exchanger then took place. The fouling was formed by fine solid polymer particles entrained by the gas stream circulating in the recycling loop. These particles were deposited on the internal walls of the heat exchanger and formed a solid polymer plug which gradually expanded as the polymerization reaction continued. This resulted in a gradual loss of the heat exchange capacity and an increase in the pressure drop in the exchanger, so that it became necessary to increase the power of the compressor in order to maintain sufficient circulation of the gas stream in the recycling loop and in the fluidized bed.

The European Patent Application 0 042 892 discloses an apparatus for recovery of condensable vapours in wasted gas to be flared comprising a gas-to-liquid heat exchanger and a mean for separating the condensed vapour from the remaining flare gas.

The German Patent Application 1 005 993 discloses a heat exchanger equipped with a bundle of tubes with a mechanical configuration allowing an easy dismantling.

Both documents disclose neither the use of heat exchangers in a gas phase process for polymerizing olefins, nor the problem of deposition, accumulation and/or piling up of particles in the heat exchanger.

The object of the present invention is to provide a polymerization process and a polymerization apparatus equipped with means which limit or prevent the deposition, the accumulation and/or the build up of particles in the recycling loop and in particular in the heat exchanger, with the advantage of not introducing into the loop any additional component capable of disrupting the polymerization reaction.

SUMMARY OF THE INVENTION

The present invention is thus a process for the gas-phase polymerization of olefin(s) using a fluidized-bed reactor (1) from which, at the top part, is withdrawn a recycling gas stream comprising unreacted gases and entrained solid particles, which is moved by virtue of a compressor and is cooled by passing into a heat exchanger (7), and which is reintroduced into the reactor at the bottom part of the latter, characterized in that the heat exchanger is a multitubular exchanger successively comprising an inlet chamber (6), a bundle of tubes (9) with a horizontal longitudinal axis and an outlet chamber (10) which is equipped with a discharge orifice (11), in which outlet chamber the flow of the recycling gas stream is accelerated up to the orifice (11) and is directed at any point in the said chamber along a horizontal axis and/or towards the bottom part of the said chamber, so as to create, in the bottom part of the said chamber, a sweeping stream which flows horizontally or with a downward inclination and without obstacle up to the orifice (11) and which promotes the entrainment of the particles up to the orifice (11).

BRIEF DESCRIPTION OF THE DRAWINGS

FIGS. 1 to 3 diagrammatically illustrate a preferred embodiment of a heat exchanger according to the present invention. FIG. 1 is a view in longitudinal section along a vertical plane of a multitubular exchanger. FIGS. 2 and 3 are views in transverse section, along II and III (as shown in FIG. 1)respectively, of the heat exchanger represented in FIG. 1.

FIG. 4 illustrates in side view a diffuser of the inlet chamber of the exchanger represented in FIG. 1.

FIG. 5 diagrammatically illustrates an apparatus for the polymerization of olefins according to the present invention, comprising in particular the heat exchanger as represented in FIG. 1.

DETAILED DESCRIPTION OF THE INVENTION

Figure 1:
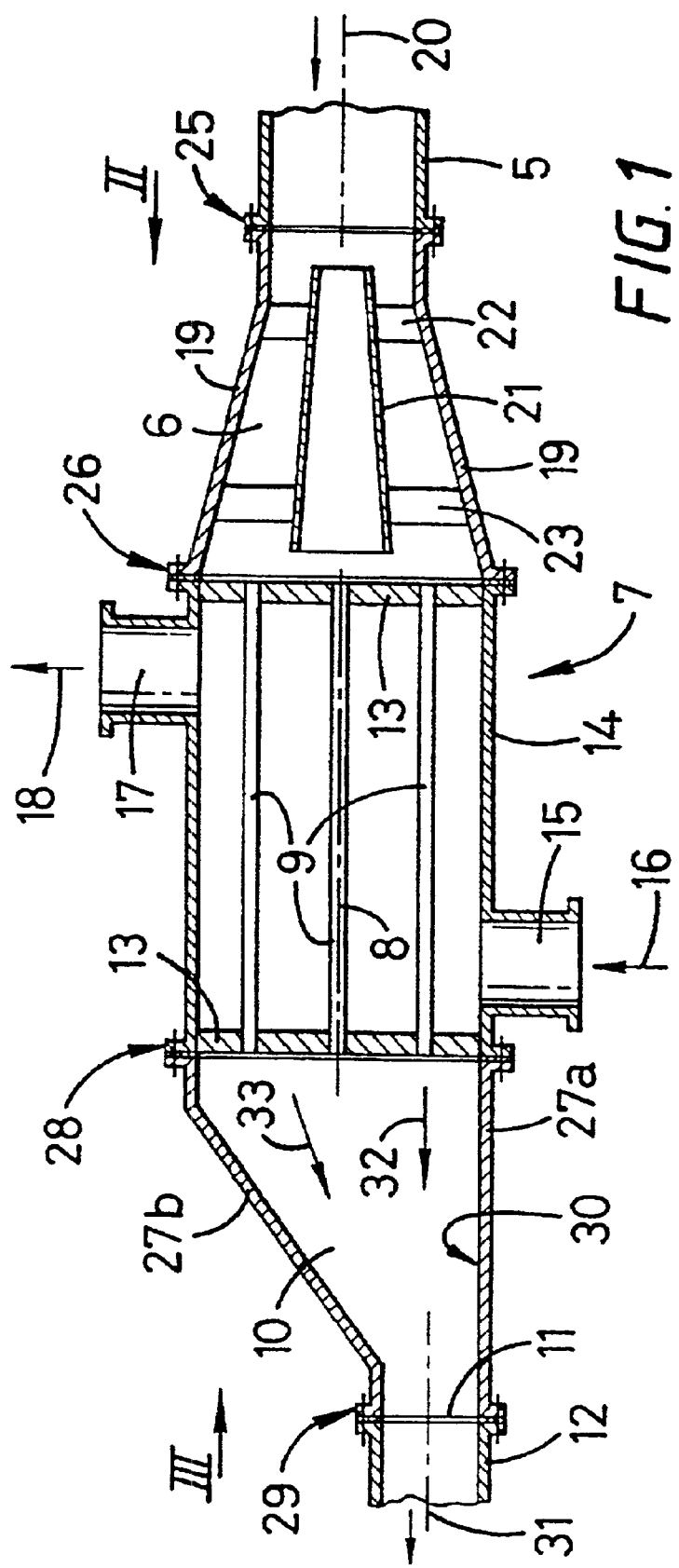

The process of the present invention is a process for the homopolymerization or for the copolymerization of olefins. The olefinic monomer can be any olefin, in particular a C2 to C8 olefin, in particular ethylene or propylene, optionally as a mixture with one another and/or with one or more alpha-olefins, especially C4 to C8 alpha-olefins.

The polymerisation process is preferably a continuous process. The polymer can be withdrawn from the reactor continuously or batchwise.

The (co)polymerization is generally carried out by continuous or semicontinuous addition of a catalyst of Ziegler-Natta type comprising at least one transition metal in combination with a cocatalyst comprising an organometallic compound, for example an organoaluminium compound. The catalyst essentially comprises an atom of a transition metal chosen from metals from Groups IV to VI of the Periodic Classification of the Elements, such as titanium, vanadium, chromium, zirconium or hafnium, optionally a magnesium atom and a halogen atom. It is also possible to use a Ziegler-Natta catalyst of metallocene type. The catalyst can be supported on a porous refractory oxide, such as silica or alumina, or be combined with a solid magnesium compound, such as magnesium chloride, magnesium oxide, magnesium hydroxychloride or a magnesium alkoxide. It is also possible to use a catalyst complexed with iron and/or cobalt, such as, for example, those disclosed in Patent Application WO98/27124 or WO98/2638. It is also possible to use a catalyst composed essentially of a chromium oxide activated by heat treatment and used in combination with a granular support based on a refractory oxide.

The catalyst can be used in the form of a prepolymer powder prepared in advance during a prepolymerization stage starting from the catalysts described above. The prepolymerization can be carried out by any process, for example a prepolymerization in suspension in a liquid hydrocarbon or in the gas phase, according to a batchwise, semicontinuous or continuous process.

The catalyst or the prepolymer can be introduced into the reactor continuously or batchwise.

According to the present invention, the recycling gas stream circulating in the recycling loop can comprise a reaction gas mixture comprising the olefinic monomer, such as ethylene or propylene, optionally as a mixture with one another and/or with one or more alpha-olefins, especially C4 to C8 alpha-olefins, at least one gas which is inert with respect to the polymerization reaction, such as nitrogen and/or one or more C1–C8 alkanes, and optionally hydrogen.

The process of the invention can comprise a cooling of the recycling gas stream in the heat exchanger according to the present invention, below the dew temperature of the reaction gas mixture constituting this stream, as well as a means making it possible to separate the gas from the liquid thus formed by condensation and to introduce the liquid, thus separated, into the reactor, as is disclosed in Patent Application WO94/28032 or EP 0 814 100.

According to the present invention, the absolute pressure in the polymerization reactor can be greater than ambient pressure, in particular ranging from 0.5 to 5 MPa. The polymerization temperature can be below the softening temperature of the (co)polymer, in particular ranging from 40 to 120° C., for example from 60 to 120° C.

According to the present invention, the reactor is a fluidized-bed reactor in which the velocity of the gas, often known as the fluidization velocity, in the main section of the reactor, in particular in the vertical cylindrical barrel of the reactor, can vary from 0.1 to 1.5 m/s, or from 0.1 to 1 m/s, preferably from 0.4 to 0.8 m/s. The fluidized bed can occupy a portion or all of the vertical cylindrical barrel of the reactor and can even occupy the first third of the disengagement chamber.

According to the present invention, the exchanger used is a multitubular exchanger successively comprising an inlet chamber, a bundle of tubes with a horizontal longitudinal axis and an outlet chamber, the outlet chamber being equipped with a discharge orifice. The velocity of the recycling gas stream in the tubes of the said exchanger is generally maintained well above the saltation limit of the entrained solid particles. When the recycling gas stream passes through the bundle of tubes and emerges in the outlet chamber, the velocity of the recycling gas stream can decrease because of the broadening of the cross-section for passage of the recycling gas stream. This can result in the deposition and the accumulation of the entrained solid particles in the outlet chamber of the exchanger.

According to the present invention, it is preferable for the recycling gas stream to circulate inside the tubes.

According to the present invention, the output chamber is designed to promote the sweeping away and the entrainment of the solid particles in its bottom part. The criteria in the design and the satisfactory operation of the said outlet chamber preferably are:

an acceleration in the velocity of flow of the recycling gas stream through the outlet chamber up to the discharge orifice, an orientation in the velocity of flow which promotes the sweeping of the bottom part of the outlet chamber, in particular by directing this at any point in the said chamber along a horizontal direction and/or towards the bottom part of the said chamber, and a flow of the recycling gas stream in the bottom part of the outlet chamber along a horizontal direction or with a downward inclination oriented toward the bottom and without obstacle up to the discharge orifice.

According to one aspect of the present invention, the flow of the recycling gas stream is accelerated through the outlet chamber up to the discharge orifice. This acceleration can be obtained by a narrowing, for example a gradual narrowing, of the cross-section for passage of the recycling gas stream along the outlet chamber. The outlet chamber walls can thus extend along a truncated cone, the wider base of which corresponds to the transverse cross-section of the bundle of tubes and in particular of a shell encasing this bundle of tubes, and the narrower base of which corresponds to the discharge orifice.

According to another aspect of the present invention, the velocity of flow of the recycling gas stream through the outlet chamber promotes the sweeping of the bottom part of the latter. This can be obtained by an asymmetric design of the internal volume of the outlet chamber, allowing an orientation of the recycling gas stream, at any point in the said chamber, along a horizontal direction and/or towards the bottom part of the latter. The outlet chamber walls can thus extend along an oblique truncated cone, the wider base of which corresponds to the transverse cross-section of the bundle of tubes and in particular of a shell encasing this bundle of tubes, and the narrower base of which corresponds to the discharge orifice, and the lower generatrix of which is horizontal or with an inclination oriented toward the bottom.

According to yet another aspect of the present invention, the flow of the recycling gas stream in the bottom part of the outlet chamber is horizontal or with an inclination oriented towards the bottom, and without obstacle up to the discharge orifice. This can be obtained by ensuring that the bottom part of the said chamber is positioned horizontally or with an inclination oriented towards the bottom, and without obstacle up to the discharge orifice. The outlet chamber walls can thus extend along an oblique truncated cone, the lower generatrix of which is horizontal or with an inclination oriented toward the bottom, preferably in continuity with the lower generatrix of the bottommost tube or tubes of the bundle, or alternatively of a shell encasing the said bundle. The outlet chamber walls preferably do not have any obstacle up to the discharge orifice. The lower generatrix of the outlet chamber walls is especially in continuity with the bottom part of the discharge orifice.

The height of the truncated cone of the outlet chamber walls can be from 0.7 to 11.4, preferably from 1 to 3.7, especially from 1.2 to 2.8 time the difference between the diameter of the larger base and the diameter of the smaller base of said truncated cone.

The inlet chamber walls can extend along the casing of a truncated cone, the wider base of which corresponds to the transverse cross-section of the bundle of tubes and in particular of a shell encasing these tubes, and the narrower base of which corresponds to the inlet orifice of said inlet chamber. The inlet chamber walls can also extend along an oblique truncated cone, and the lower or the upper generatrix of which can be horizontal. Said lower or upper horizontal generatrix can moreover be in continuity with the lower or the upper generatrix respectively, of the bundle of tubes or alternatively of a shell encasing the said bundle. Said lower or upper horizontal generatrix can furthermore be in continuity with the bottom or the top part respectively, of the inlet orifice of the inlet chamber.

Preferably, the inlet chamber walls of the heat exchanger extends along the casing of a right truncated cone with a horizontal axis of symmetry which is coincident with that of the bundle of tubes or of a shell encasing the bundle of tubes.

A preferred form of the present invention consists in ensuring that the flow of the recycling gas stream is uniformly distributed throughout the vertical cross-section of the inlet chamber, (and consequently at the inlet of the bundle of tubes of the heat exchanger) by the use of at least one diffuser positioned within the inlet chamber of said exchanger.

The term "horizontal" or "horizontally" used in the present description is understood to mean preferably any plane or any direction which is horizontal to within more or less five degrees, preferably three degrees, with respect to the horizontal.

The expression "outlet chamber wall" is understood to mean internal wall of said outlet chamber.

According to a preferred embodiment of the process of the invention, the recycling gas stream flowing in the pipes of the recycling loop and more particularly in the tubes of the multitubular exchanger has a velocity which is greater than the saltation velocity of the solid particles entrained in the recycling gas stream, preferably greater than the minimum velocity necessary for pneumatic conveyance of the entrained solid particles, in particular of greater than 1 meter per second, preferably of greater than 5 meters per second, for example ranging from 5 to 20, in particular from 7 to 15 meters per second.

According to another aspect, the present invention relates to an apparatus for the gas-phase polymerization of olefin(s) which comprises a fluidized-bed reactor fed with olefin and with a catalyst and a recycling loop comprising:

at least one first pipe for conveying a recycling gas stream withdrawn at the top part of the reactor, optionally a gas/liquid separator, at least one heat exchanger for cooling the recycling gas stream, at least one compressor for moving the recycling gas stream, and at least one second pipe for conveying the recycling gas stream in order to introduce it into the bottom part of the reactor, characterized in that the said exchanger is a multitubular exchanger which successively and jointly comprises an inlet chamber, a bundle of tubes with a horizontal longitudinal axis encased in a horizontal cylindrical shell and an outlet chamber, the outlet chamber being equipped with a discharge orifice, the wall of said outlet chamber extending along an oblique truncated cone, the larger base of which is connected to the shell and the smaller base of which corresponds to the discharge orifice connected to the second pipe, the lower generatrix of the oblique truncated cone being horizontal or with a downward inclination and preferably in continuity with the lower generatrix of the shell. The large base of the oblique truncated cone, preferably corresponds to the transverse cross-section of the bundle of tubes and in particular of the shell encasing the bundle of tubes.

More particularly, the present invention relates to an apparatus for the gas-phase polymerisation of olefin(s) which comprises a fluidised-bed reactor fed with said olefin(s) and with a catalyst and having a top part and a bottom part, and a recycling loop for circulating a gas stream containing said olefin(s) through said reactor, the recycling loop comprising (a) a compressor having a suction orifice and a delivery orifice for circulating said gas stream within said recycling loop and said reactor, (b) at least one first pipe connecting said top part of the reactor to the said suction orifice of the compressor, (c) at least one second pipe connecting said delivery orifice of the compressor to said bottom part of the reactor, and (d) at least one heat exchanger positioned in said recycling loop for cooling said gas stream, the apparatus being characterized in that said heat exchanger is a multitubular exchanger which successively and jointly comprises an inlet chamber, a bundle of tubes with a horizontal longitudinal axis encased in a horizontal cylindrical shell and an outlet chamber, the outlet chamber being equipped with a discharge orifice, the wall of said outlet chamber extending along an oblique truncated cone, the larger base of which is connected to the shell and the smaller base of which corresponds to the discharge orifice connected to the second pipe, the lower generatrix of the oblique truncated cone being horizontal or with a downward inclination and preferably in continuity with the lower generatrix of the shell. The large base of the oblique truncated cone, preferably corresponds to the transverse cross-section of the bundle of tubes and in particular of the shell encasing the bundle of tubes.

The term "pipe" is generally understood to mean a conduit or a tube with a preferably circular transverse cross-section.

The recycling loop is equipped with the heat exchanger which is more particularly positioned in the recycling loop upstream from the compressor, i.e. in the first pipe, so that a first portion of said first pipe connects said top part of the reactor to the inlet chamber of said heat exchanger, and a second portion of said first pipe connects the outlet chamber of said heat exchanger to the suction orifice of said compressor. Preferably, the heat exchanger is positioned in the recycling loop downstream from the compressor, i.e. in the second pipe, so that a first portion of said second pipe connects the delivery orifice of said compressor to the inlet chamber of said heat exchanger, and a second pipe portion of said second pipe connects the outlet chamber of said heat exchanger to said bottom part of the reactor.

Other heat exchangers, particularly vertical heat exchangers, can be positioned in the recycling loop upstream or downstream from the compressor.

The recycling loop, in addition, may be equipped with a gas/liquid separator such as the separator disclosed in Patent Application WO 94/28032 or EP 0 814 100. The gas/liquid separator can be positioned in the recycling loop upstream or downstream from the compressor.

According to another preferred embodiment of the present invention, the wall of the inlet chamber of the exchanger preferably extends along a right truncated cone with an horizontal axis of symmetry identical to that of the shell encasing the bundle of tubes is preferably equipped with at least one internal diffuser.

An advantage of the process and of the apparatus of the invention is that of limiting or of preventing the deposition, the accumulation and/or the build up of particles in the recycle loop and in particular in the heat exchanger, it not being necessary, in order to do this, to introduce into the loop an additional agent which is capable of disrupting the polymerization reaction.

Another advantage of the present invention is that of maintaining the heat exchange coefficient of the heat exchanger at its maximum level required for optimizing the production of polymer over a very long period of use, without having to interrupt the polymerization in order to clean the exchanger.

Yet another advantage of the present invention is that of limiting the fouling of the heat exchanger and thus of maintaining the pressure drop of said heat exchanger at a sufficiently low level to keep the gas flow throughput constant and thus of having a sufficient fluidization velocity to optimize the agitation of the fluidized bed.

In the present figures, identical or similar items carry, except where otherwise indicated, the same references from one figure to another.

The apparatus presented in FIG. 5 comprises a fluidized-bed (2) reactor (1), the upper end is connected to a first pipe (3) for conveying the recycling gas stream up to the suction orifice of a compressor (4). The gases are delivered by the latter to a conveying pipe (5) connected to the inlet orifice of the inlet chamber (6) of a multitubular exchanger (7) with a horizontal longitudinal axis (8). The recycling gas stream exiting from the tubes (9) in FIG. 1 is collected in an outlet chamber (10), which is connected via its discharge orifice (11) in FIG. 1 to a second pipe (12) for return of the cooled recycling gas stream up to the bottom part (1a) of the reactor. The reactor comprises a grid (or distribution plate) (1b) and a disengagement chamber (1c). The recycling gas stream travels through the reactor along an ascending direction, from (1a) into (1c), passing through the grid (1b) and the bed (2).

According to FIG. 1, the exchanger (7) in practice comprises several hundred tubes (9) several meters long, forming a bundle, only three of which tubes are represented, which extend horizontally between two plates (13) to which they are attached. The exchanger comprises a cylindrical and horizontal shell (14) equipped with a connection (15) for entry (according to the arrow 16) of cooling water and a connection (17) for departure (according to the arrow 18) of water.

According to FIGS. 1 and 2, the inlet chamber (6) for the gases is delimited by a frustoconical wall (19) extending, between two end flanges (25) and (26), along the longitudinal axis (20) for rotational symmetry common to the pipe (5), to the chamber (6) and to a frustoconical diffuser (21) equipping this inlet chamber. The diffuser (21) allows the flow of the recycling gas stream to be uniformly distributed over the entire transverse cross-section of the inlet chamber and consequently in the tubes of the bundle of the exchanger. This axis (20) is substantially coincident with the longitudinal axis (8) of the shell of the exchanger, As illustrated in FIGS. 2 and 4, the right frustoconical hollow structure of the diffuser (21) is welded to the walls (19) by three upstream supports (22) and by three downstream supports (23) positioned evenly spaced (by 120°) around the frustoconical diffuser wall (24).

According to FIGS. 1 and 3, the outlet chamber (10) for the gases is delimited by an oblique frustoconical wall (27a), (27b) extending between two circular flanges (28), (29) for respective attachment of the chamber (10) to the shell, on the one hand, and to the pipe (12) for return to the reactor, on the other hand. The lower generatrix (30) of the wall (27)

extends horizontally, in the elongation of the lower generatrix (31) of the pipe (12) and in the elongation of the lower generatrix of the shell of the exchanger, which corresponds substantially to the lower generatrix of the bottommost tube of the bundle.

According to FIG. 1, the flow velocity at any point in the outlet chamber (10) is directed along a substantially horizontal direction, along the vector (32), and/or towards the bottom part of the said chamber, along the vector (33).

EXAMPLE 1 (COMPARATIVE)

The apparatus used in this example was identical to that diagrammatically illustrated in FIG. 5 apart from the heat exchanger (7). A fluidised bed (2) reactor (1) comprised a grid (1b), a cylindrical section with a diameter of 3 meters, and a disengagement chamber (1c). The total height of the reactor was 20 meters. The fluidised bed (2) was maintained at a constant height of 8 meters above the grid, at a temperature of 80° C., under a total pressure of 2 MPa, and comprised a powder of an ethylene/1-butene copolymer. The reactor was fed by an ethylene prepolymer prepared from (a) a Ziegler-Natta type catalyst described in example 1 of the French patent n°2 405 961, containing titanium, magnesium and chlorides components and (b) a tri-n-octylaluminium, in a quantity such as the molar ratio Al/Ti was equal to 0.7. The prepolymer contained 40 g of polyethylene per millimole of titanium. The prepolymer feed flow rate to the reactor was such as it corresponded-to a flow rate of 830 millimoles of titanium per hour.

The reacting gaseous mixture contained (by volume) 26% of ethylene, 5.2% of hydrogen, 58.6% of nitrogen, 10.2% of 1-butene. This gaseous mixture was crossing the fluidised bed with an ascending velocity of 0.5 m/s. At the top of the fluidised bed reactor (1c) a recycling gaseous stream was withdrawn, conveyed through a gas/solid separator (not shown in FIG. 5), cooled in a vertical multitubular heat exchanger (not shown in FIG. 5), moved by a compressor (4), cooled again through an horizontal multitubular heat exchanger, and finally recycled back to the bottom of the reactor (1a) under the grid(1b).

The horizontal heat exchanger comprised an inlet chamber (19) with a shape of a right truncated cone, a cylindrical shell (14) encasing a bundle of tubes (9) and an outlet chamber with a shape of a right truncated cone.

A solution of 0.06% in weight of triethylaluminium in hexane was being introduced into the recycling gaseous stream between the horizontal heat exchanger and the bottom of the reactor (1a), with a flow rate of 2 kg/hr.

The fluidised bed reactor was operated continuously under these conditions producing about 4 tons/hour of an ethylene/1-butene copolymer. It was observed after a period of two weeks of continuous operation, that the horizontal multitubular heat exchanger was progressively becoming less efficient at cooling the recycling gas stream. This was due to the blockage of the tubes of said exchanger. This led to a reduction of the copolymer production rate and ultimately, after 3 months of continuous production, to the shutdown of the production in order to clean the horizontal multitubular heat exchanger.

EXAMPLE 2

The same apparatus as the one of the Example 1 (Comparative) was used, except that the horizontal multitubular heat exchanger was replaced with the exchanger (7) of the present invention as illustrated in FIG. 1. The outlet chamber walls (27a, 27b) of the horizontal multitubular heat exchanger (7) extended along an oblique truncated cone, the large base of which being connected to the shell (14) and the small base of which corresponding to the discharge orifice connected to the second pipe (12), the lower generatrix of which was horizontal in continuity with the lower generatrix of a shell encasing the bundle of tubes and in continuity with the bottom part of the discharge orifice. The outlet chamber walls (27a, 27b) of the horizontal multitubular heat exchanger did not have any obstacle up to the discharge orifice.

The fluidised bed reactor was operated continuously under these conditions with a ethylene/1-butene copolymer production rate identical to the one of Example 1. After a period of time of continuous operation of more than one year, there was no significant loss of heat exchange efficiency in the horizontal multitubular heat exchanger (7). No shutdown due to the significant loss of production rate was necessary, during this period.

What is claimed is:

1. A process for the gas-phase polymerization of olefin(s) in a fluidized-bed reactor, comprising
    feeding a fluidized-bed reactor with olefin(s) and with catalyst,
    maintaining solid particles of polymer formed and of the catalyst in a fluidized state within the reactor by the action of an ascending gas stream containing the olefin (s), starting from a base of the reactor and rising up to a top part thereof,
    withdrawing a recycling gas stream containing unreacted gases and entrained solid particles from the top part of the reactor,
    moving the recycling gas stream with a compressor,
    cooling the recycling gas stream by passing the recycling gas stream into a multitubular heat exchanger successively having an inlet chamber, a bundle of tubes with a horizontal longitudinal axis and an outlet chamber equipped with a discharge orifice,
    accelerating the flow of the recycling gas stream in the outlet chamber up to the discharge orifice,
    directing the flow of the recycling gas stream at any point in the outlet chamber of the heat exchanger along a horizontal axis and/or towards a bottom part of the outlet chamber so as to create in the bottom part a sweeping stream that flows horizontally or with a downward inclination and without obstruction up to the discharge orifice to promote entrainment of the solid particles therein up to the discharge orifice, and
    reintroducing the cooled recycling gas stream from the discharge orifice of the heat exchanger at the base of the reactor.

2. The process of claim 1, wherein the flow of the recycling gas stream is uniformly distributed throughout a vertical cross-section of the inlet chamber of the heat exchanger with at least one diffuser positioned within the inlet chamber of said heat exchanger.

3. The process of claim 1, wherein the recycling gas stream flowing in the tubes of the multitubular heat exchanger has a velocity greater than a minimum velocity necessary for pneumatic conveyance of the entrained solid particles.

4. The process of claim 3, wherein the recycling gas stream flowing in the tubes of the multitubular heat exchanger has a velocity ranging from 5 to 20 meters per second.

5. The process of claim 4, wherein the recycling gas stream has a velocity ranging from 7 to 15 meters per second.

* * * * *